United States Patent [19]
Cyr et al.

[11] Patent Number: 6,166,637
[45] Date of Patent: Dec. 26, 2000

[54] APPARATUSES FOR ELECTRONIC IDENTIFICATION OF A PLURALITY OF PASSING UNITS AND METHODS OF ELECTRONIC IDENTIFICATION OF A PLURALITY OF PASSING UNITS

[75] Inventors: Scott R. Cyr, Eagle; Ross S. Dando, Nampa, both of Id.

[73] Assignee: Micron Technology, Inc., Boise, Id.

[21] Appl. No.: 09/247,142

[22] Filed: Feb. 9, 1999

[51] Int. Cl.[7] .................................................. G08B 13/14
[52] U.S. Cl. .................................... 340/572.7; 340/572.1; 340/572.8; 119/51.02; 343/842; 343/867; 343/742
[58] Field of Search ............................. 340/572.7, 572.1, 340/572.3, 573.1; 119/51.02; 283/70, 74; 343/842, 702, 867, 866, 742

[56] References Cited

U.S. PATENT DOCUMENTS

| | | | |
|---|---|---|---|
| 4,373,163 | 2/1983 | Vandebult | 343/842 |
| 4,798,175 | 1/1989 | Townsend et al. | 340/572.7 |
| 5,451,965 | 9/1995 | Matsumoto | 343/702 |
| 5,585,811 | 12/1996 | Jetzer | 343/867 |
| 5,604,485 | 2/1997 | Lauro et al. | 340/572.5 |
| 6,020,856 | 2/2000 | Alicot | 343/742 |
| 6,069,564 | 5/2000 | Hatano et al. | 340/572.7 |

*Primary Examiner*—Benjamin C. Lee
*Attorney, Agent, or Firm*—Wells, St. John, Roberts, Gregory & Matkin, P.S.

[57] ABSTRACT

In one aspect, the invention encompasses a system for electronic identification of a plurality of units. The system comprises transponders which are connected with respective individual units, and which comprise antennas. The system further comprises an interrogator configured to read the transponders. The interrogator includes an interrogator antenna. At least one of the interrogator antenna or the transponder antennas comprise a coil of conductive material which has a first planar portion within a first plane and a second planar portion within a second plane, with the first and second planes intersecting. In another aspect, the invention comprises a method for electronic identification of a plurality of passing animal bodies, wherein the individual animal bodies have respective transponders associated therewith. An interrogator having an antenna associated therewith is provided. The antenna is proximate a housing with a periphery having a shape comprising a recessed central region and a projecting peripheral region extending from the central region. Animal bodies are passed by the housing, and at least some of the passing animal bodies are purposefully bumped against the projecting peripheral region. The bumping into the projecting peripheral region changes an orientation of transponders associated with the individual passing animal bodies relative to the antenna.

67 Claims, 8 Drawing Sheets

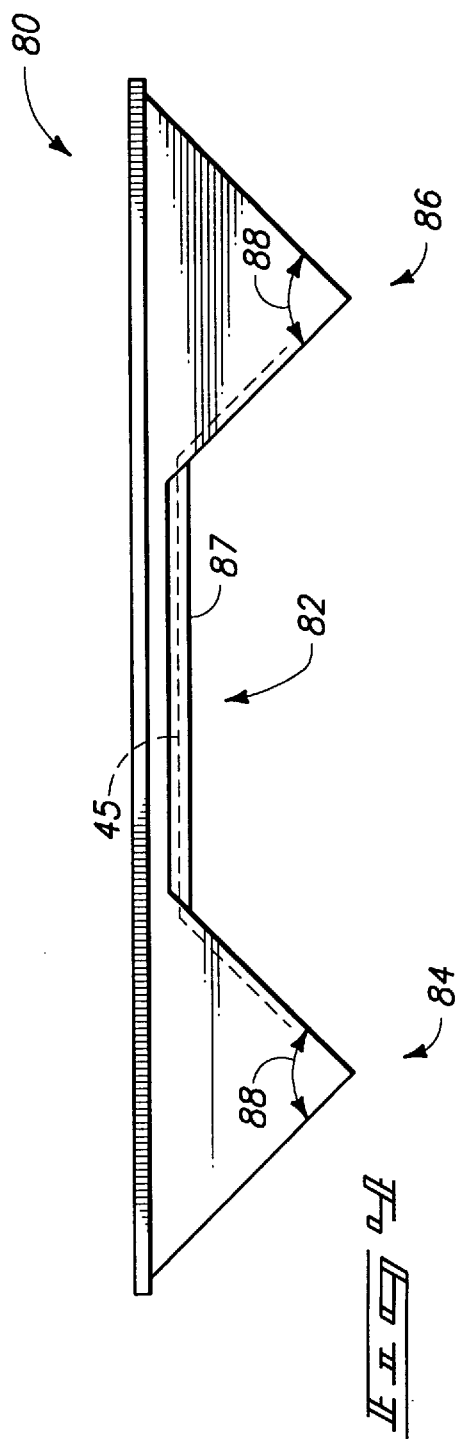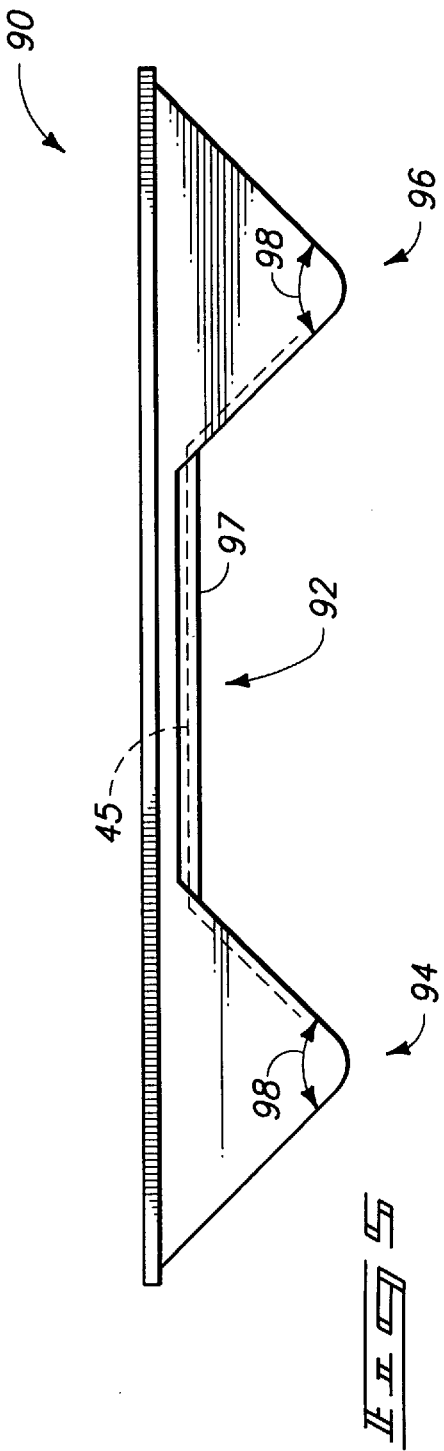

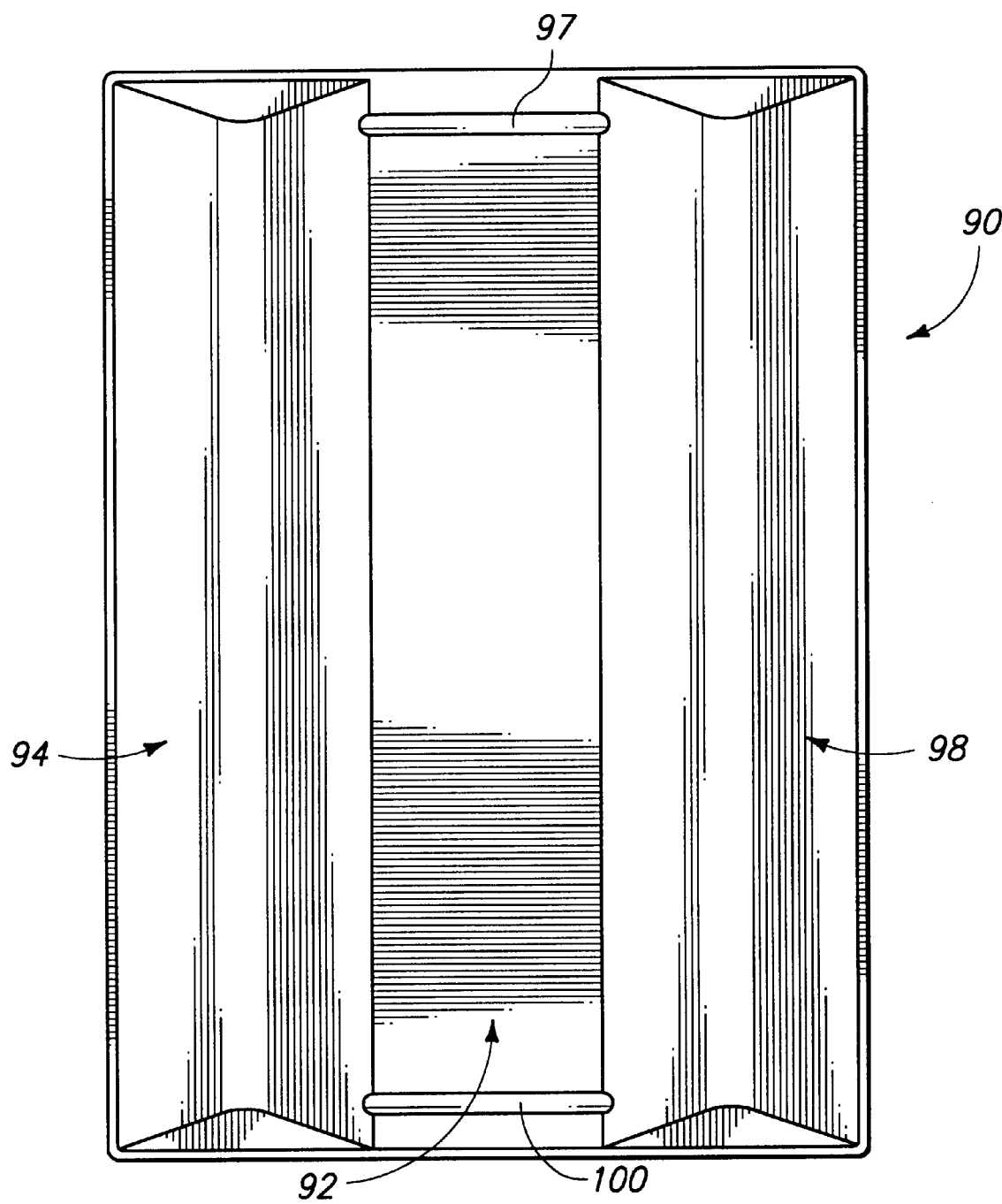

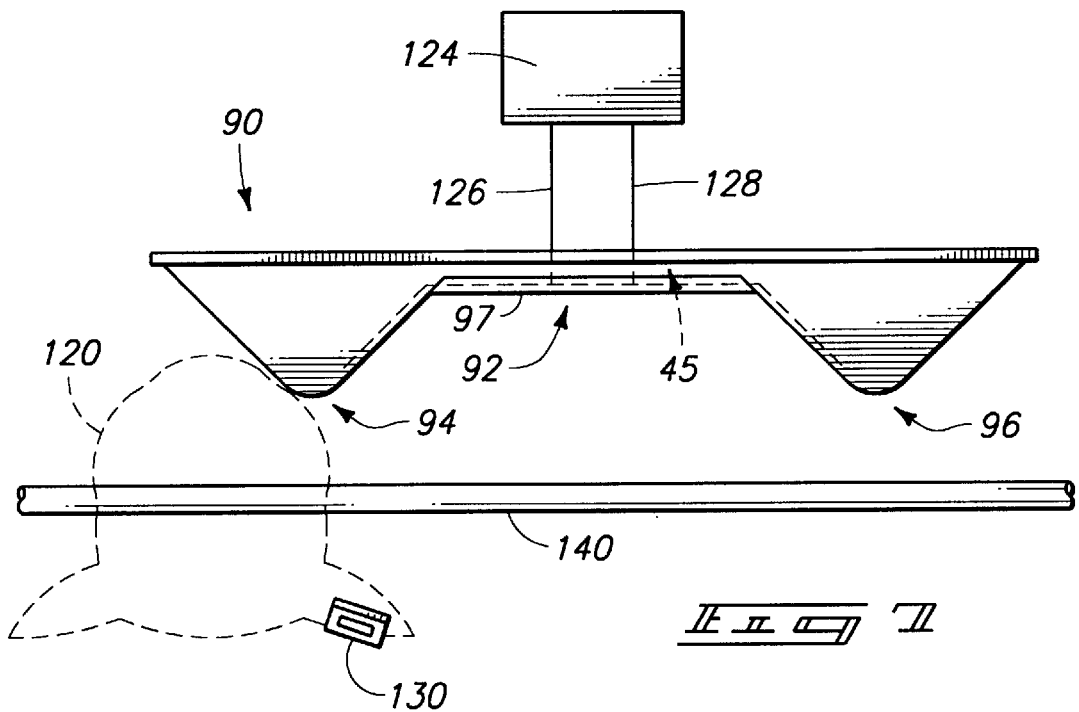
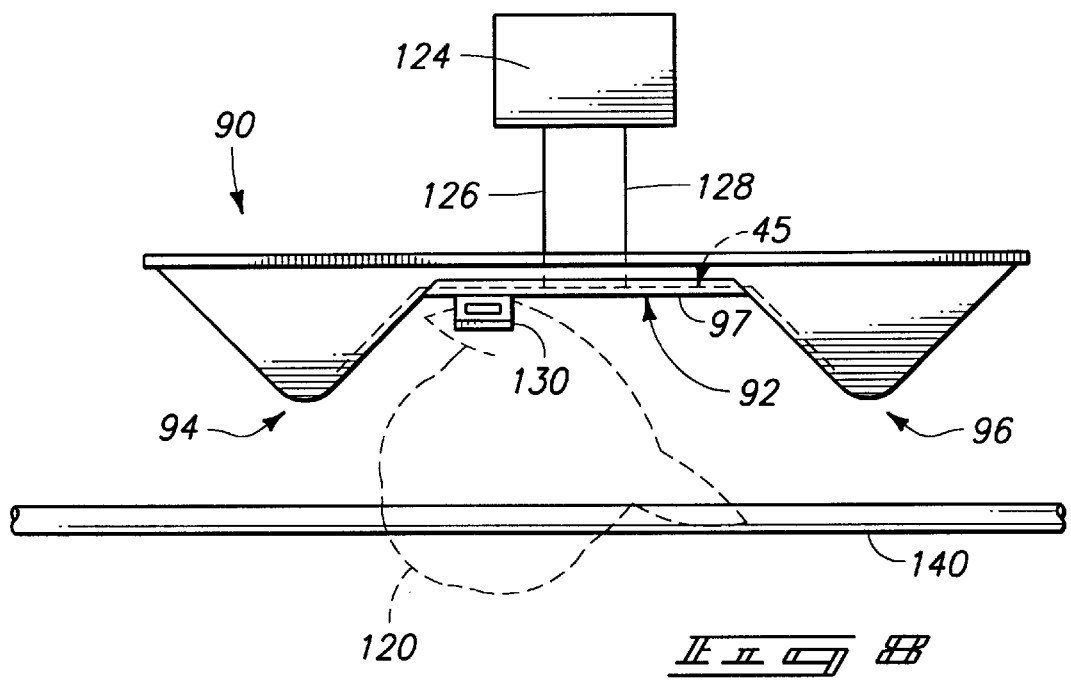

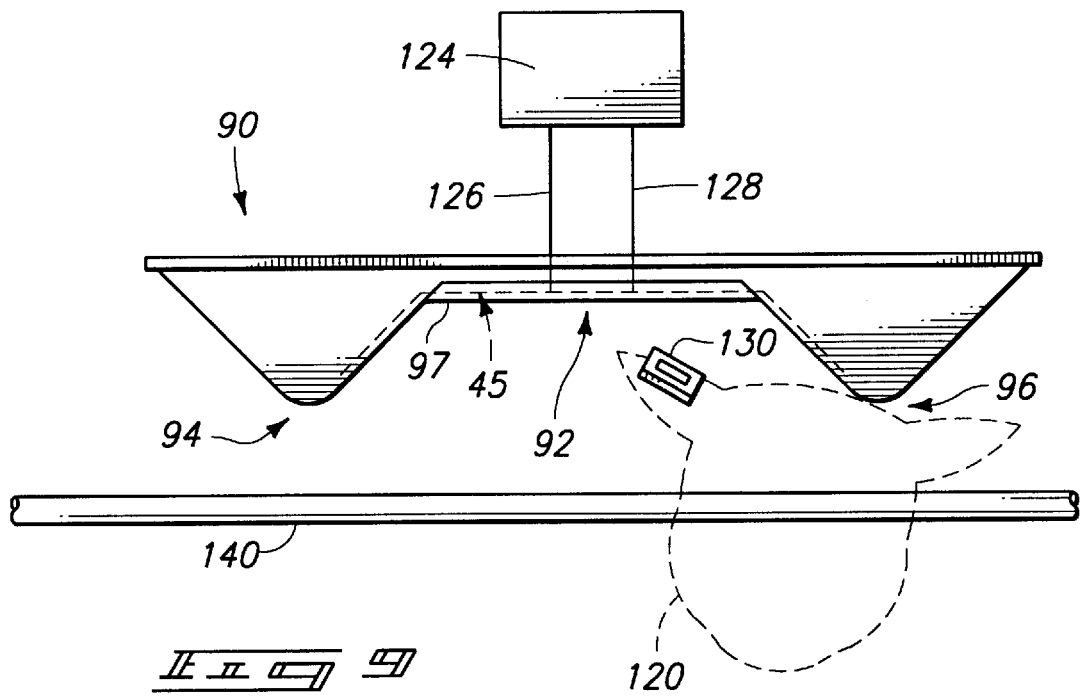
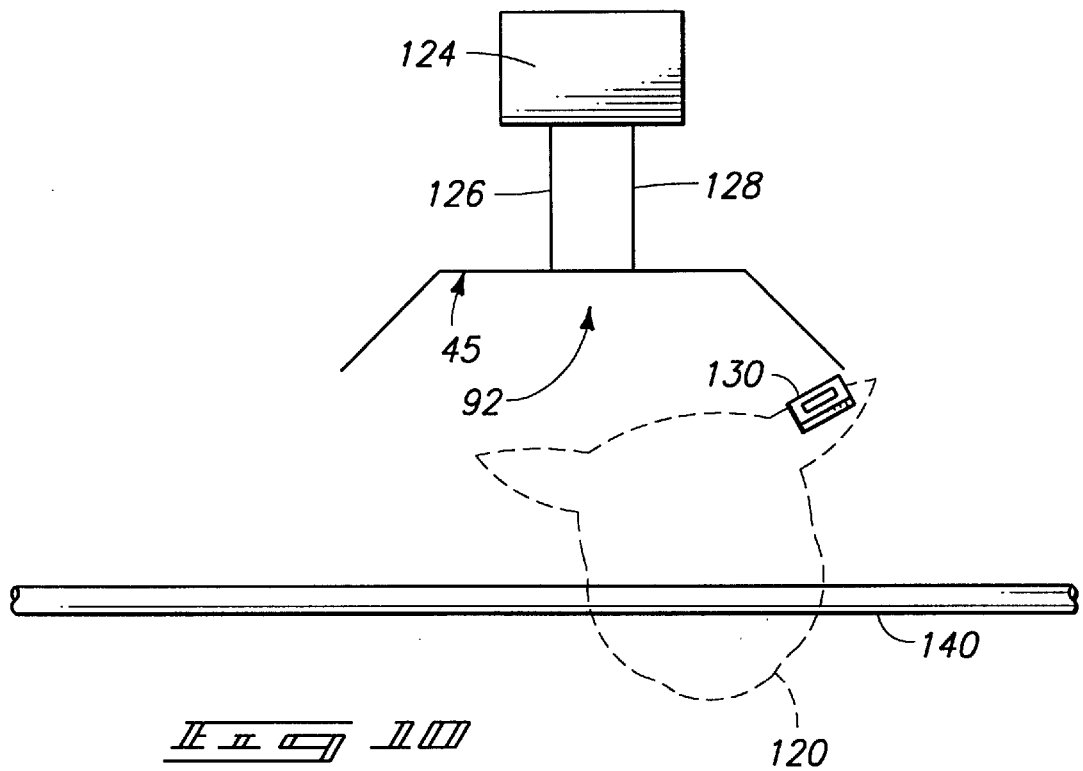

APPARATUSES FOR ELECTRONIC IDENTIFICATION OF A PLURALITY OF PASSING UNITS AND METHODS OF ELECTRONIC IDENTIFICATION OF A PLURALITY OF PASSING UNITS

TECHNICAL FIELD

The invention pertains to methods and apparatuses for electronic identification of passing units. In particular applications, the invention pertains to methods and apparatuses for identification of passing animal bodies.

BACKGROUND OF THE INVENTION

Radio frequency identification devices (RFID's) are commonly utilized for electronically identifying objects. In an exemplary application, a transponder unit is attached to an object which is to be identified. The transponder unit is incorporated into a passive, readonly RFID system which comprises an interrogator used in conjunction with the transponder. The interrogator provides a carrier signal which powers (stimulates) the transponder and causes a signal to be transmitted from the transponder. The signal comprises data which identifies the object associated with the transponder. The signal is received by the interrogator, which is in data communication with a processing system configured to decode and interpret the data.

The interrogator commonly uses a coil antenna to stimulate the transponder. Such coil antenna consists of one or more coils of conductive material provided within a single plane, and can be in the form of, for example, a loop antenna. The transponder will frequently comprise a parallel resonant LC circuit, with such circuit being resonant at a carrier frequency of the interrogator. The transponder can also comprise a coil antenna.

An exemplary application of a passive, read-only RFID system is for identification of individual animals in a meat-processing plant. A reason for identifying individual animals in a meat-processing plant is to improve meat quality and/or farming processes. For instance, in modern farming practices it is desirable to track an animal throughout its entire lifetime up to, and including, slaughter to aid in understanding the factors that influence meat quality. To accomplish such tracking, an RFID transponder tag can be placed in an animal's ear at time of birth, and utilized to document events occurring within the animal's life. For instance, the RFID transponder can be utilized with interrogators to catalog the feed ingested by the animal, vaccinations provided to the animal, and any growth hormones administered to the animal. The transponder can further be utilized in combination with an interrogator at time of slaughter to catalogue the meat quality of the animal. Transponders can be utilized to track many (or even all) of the individual animals of a population, and information accumulated by the transponders can be studied to relate the effect, if any, of particular farming practices on meat quality.

In another exemplary use of a RFID in a meat-processing plant, transponders are provided on individual animal bodies within the plant to enable tracking of the bodies during processing to enable, for example, meat products from a particular body to be pulled in the event the body is found to be contaminated or diseased.

An exemplary system for utilizing passive, read-only RFID for identification and tracking of individual animals in a meat-processing plant is described with reference to FIGS. 1 and 2. Referring to FIG. 1, an interrogator 10 comprises a signal processing unit 12 and a planar coil antenna 14 electrically connected with processing unit 12. An animal body 16 (shown as a cow) is hung from a rail 18 and guided past antenna 14. A transponder 20 is attached to the animal body (specifically, transponder 20 is attached to an ear of the cow 16 in the shown embodiment). Transponder 20 comprises a planar coil antenna 22 (not visible in the view of FIG. 1, but shown in FIG. 2) which is configured as an inductive portion of a parallel resonant LC circuit. As animal body 16 passes antenna 14, transponder 20 is stimulated by a field (generally a magnetic field) established by antenna 14. The stimulated transponder then emits data which is received by interrogator 10 and subsequently processed to identify animal body 16. It is noted that the shown methodology of hanging the animal body from a rail is but one of many methodologies which can be utilized for transporting the animal bodies past antenna 14. Other methodologies include, for example, carting the animal bodies.

FIG. 2 illustrates an identical application as that of FIG. 1, with the difference that at least a portion of animal body 16 has swivelled relative to the orientation shown in FIG. 1. Accordingly, whereas the transponder of coil 22 of FIG. 1 is contained within a plane that is substantially parallel to the plane of antenna coil 14, the transponder coil 22 of FIG. 2 is contained within a plane that is substantially perpendicular to the plane of antenna 14. A difficulty with the processing shown in FIGS. 1 and 2 is that while the orientation shown in FIG. 1 results in good induction of a current in transponder 20 from the magnetic field of antenna 14, the orientation of FIG. 2 results in little or no induction. In fact, it is found that if transponder coil 22 is within a plane that is tilted more than about 27° from parallel with a plane comprising antenna coil 14, there will be little or no data transfer from transponder 20 to antenna 14.

It would be desirable to develop alternative RFID systems which avoid at least some of the problems associated with the orientation dependencies of transponder 20 relative to antenna 14.

SUMMARY OF THE INVENTION

In one aspect, the invention encompasses a system for electronic identification of a plurality of units. The system comprises transponders which are connected with respective individual units and coded to identify the individual units. The transponders comprise transponder antennas. The system further comprises an interrogator configured to read the transponders of the units. The interrogator includes an interrogator antenna. At least one of the interrogator antenna or the transponder antennas comprise a coil of conductive material which has a first planar portion within a first plane and a second planar portion within a second plane, with the first and second planes intersecting.

In another aspect, the invention comprises a method for electronic identification of a plurality of passing animal bodies, wherein the individual animal bodies have respective transponders associated therewith and coded to identify the individual animal bodies. An interrogator having an antenna associated therewith is provided. The antenna is proximate a housing with a periphery having a shape comprising a recessed central region and a projecting peripheral region extending from the central region. The antenna extends along the central region. Animal bodies are passed by the housing. At least some of the passing animal bodies are purposefully bumped against the projecting peripheral region.

BRIEF DESCRIPTION OF THE DRAWINGS

Preferred embodiments of the invention are described below with reference to the following accompanying drawings.

FIG. 4 is a top view of a first embodiment housing unit containing the coil antenna of FIG. 3 (with the antenna shown in phantom view within the housing).

FIG. 5 is a top view of a second embodiment housing unit containing the coil antenna of FIG. 3 (with the antenna shown in phantom view within the housing).

FIG. 6 is a front view of the housing unit of FIG. 5.

FIG. 7 is a top view of the housing unit of FIG. 5 incorporated into an animal processing system, with an animal body shown in dashed line, diagrammatic, cross-sectional view.

FIG. 8 is a view of the FIG. 7 system shown at a processing step subsequent to that of FIG. 7.

FIG. 9 is a view of the FIG. 7 processing system shown at a step subsequent to that of FIG. 8.

FIG. 10 is a top view of the coil antenna of FIG. 3 incorporated into an animal processing system, with an animal body shown in dashed line, diagrammatic, cross-sectional view.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In one aspect, the invention encompasses a method of forming an interrogator antenna configured to better stimulate a transponder coil at orientations that are difficult to stimulate with prior art interrogator antenna designs. It is recognized that the prior art planar antenna designs generate a magnetic field by current passed through the antenna coil, with such field having a peak value which is orthogonal to a plane of the coil. When an RFID transponder passes through this field, optimum performance or range results if the transponder's coil plane is parallel to the antenna coil plane. If the transponder coil is presented to the antenna coil at a 90° angle, then there is effectively no performance at any range. In a particular application, a useful range is from about zero to about fourteen inches, with about six inches being a common minimum useful range. With conventional planar interrogator antenna coil designs, such six inch range can generally not be achieved if a plane of a transponder coil is at an angle of from 75° to 90° of a plane of an interrogator antenna coil.

In contrast to conventional interrogator antenna design, the invention encompasses antenna designs wherein the coil extends within at least two intersecting planes. The coil can be made of conventional materials, with the intersecting planes producing magnetic fields which intersect. Such magnetic fields allow RFID transponder coils passing at 90° to one of the planes to communicate with the interrogator through the other plane.

Figure 1:
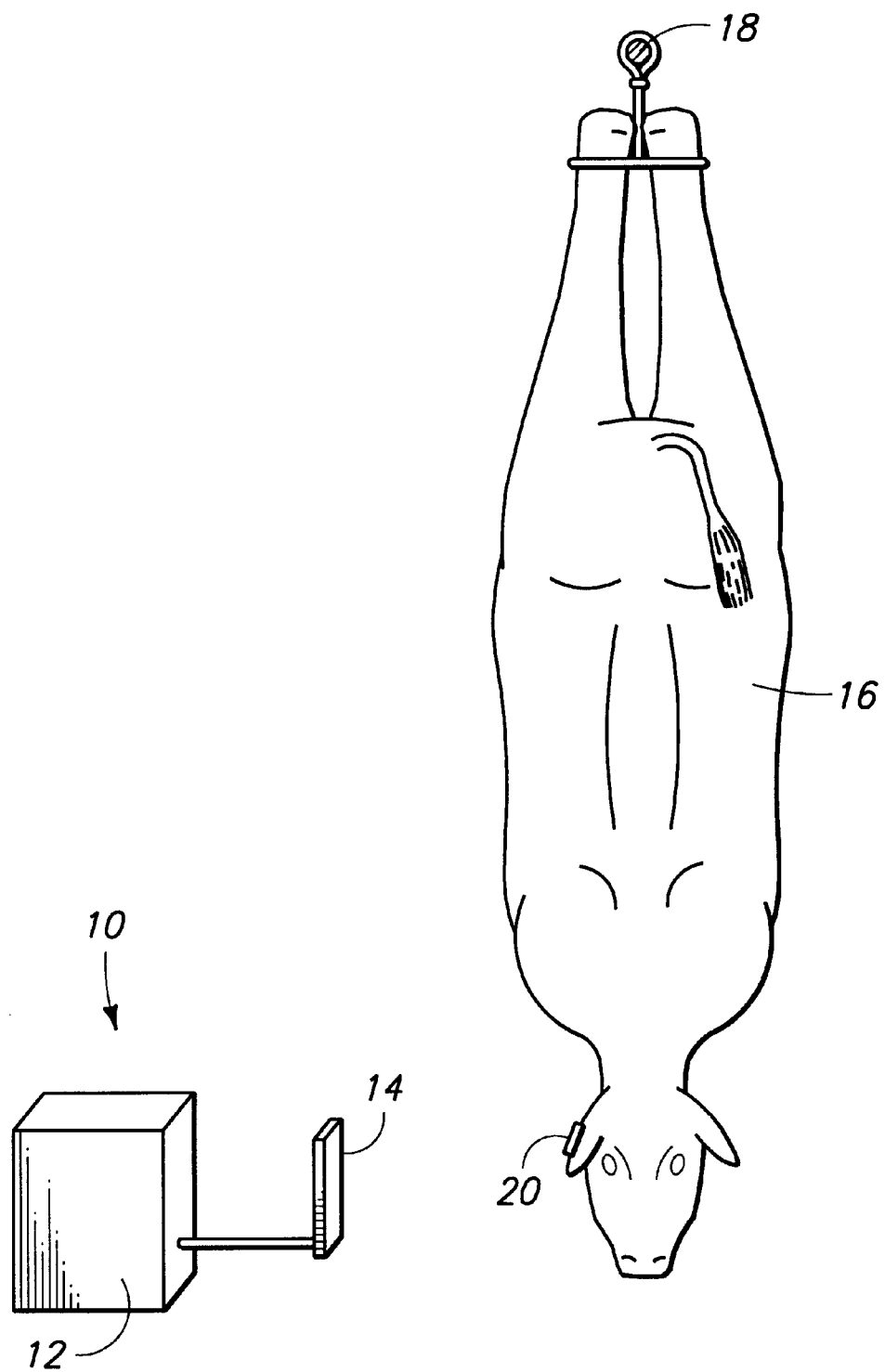
FIG. 1 is a schematic, diagrammatic, perspective view of a prior art RFID system being utilized in an animal processing application.
Figure 2:
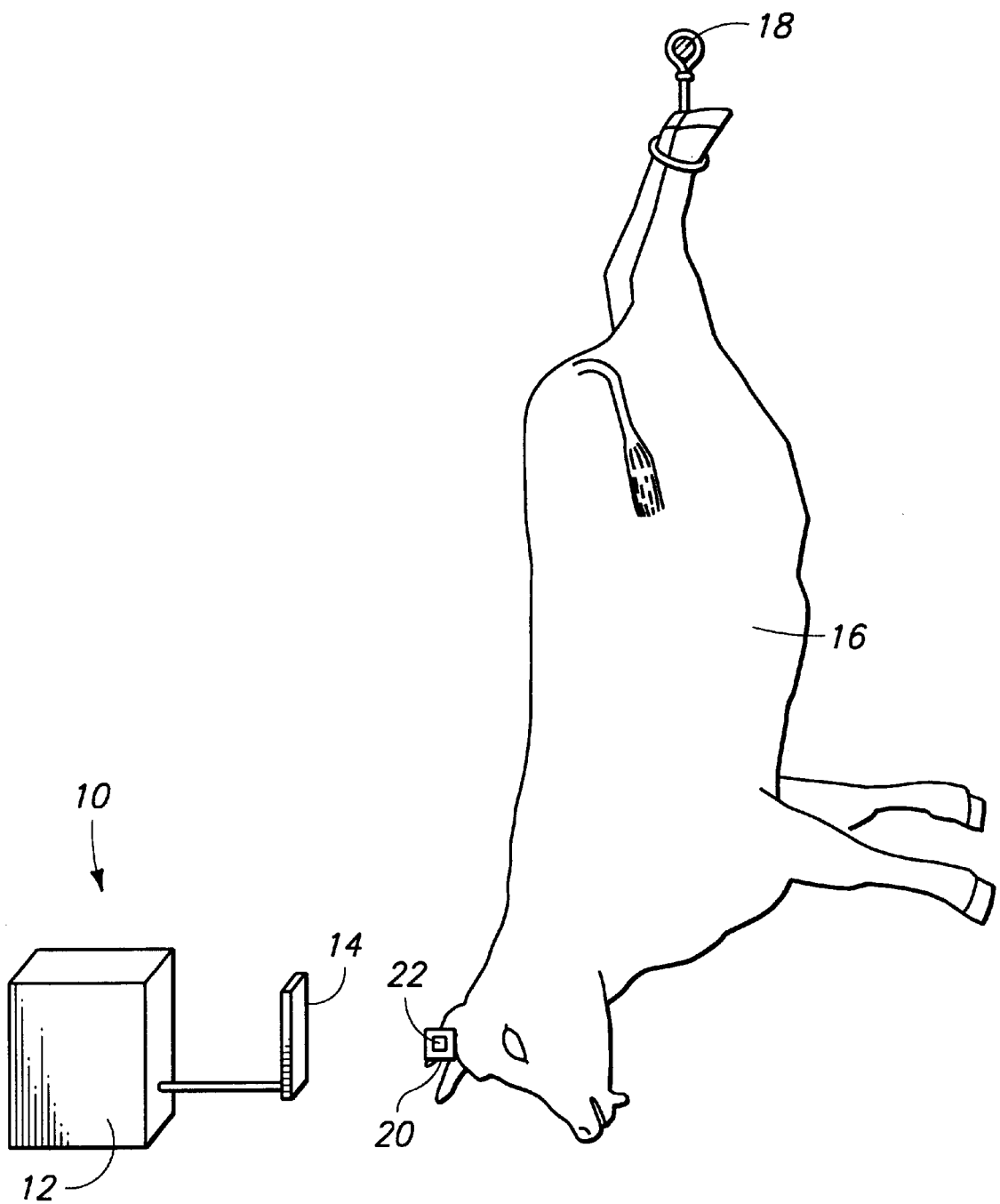
FIG. 2 is a view of the FIG. 1 system shown with the animal body twisted relative to its position in FIG. 1.
Figure 3:
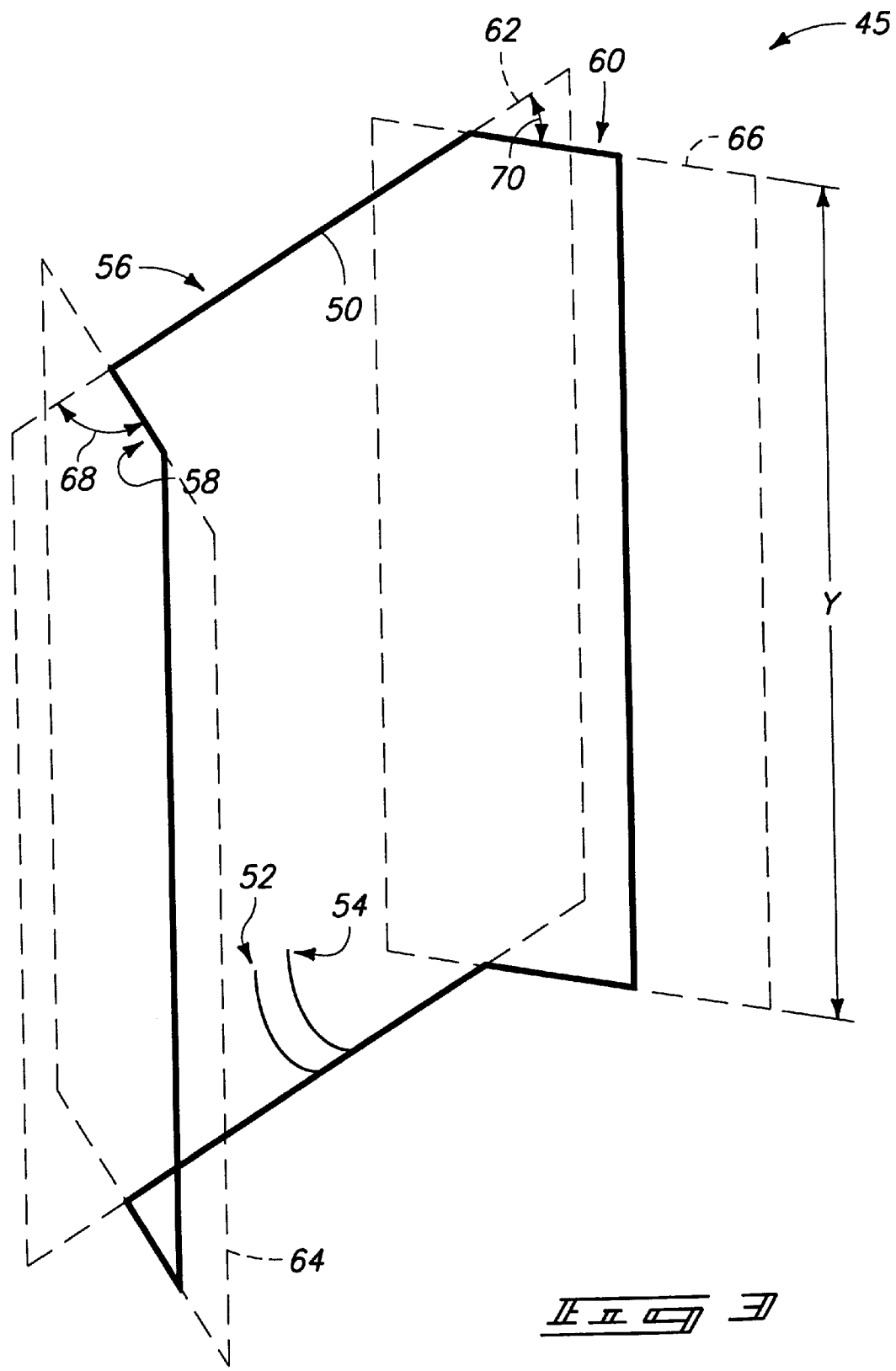
FIG. 3 is a diagrammatic, perspective view of a preferred embodiment coil antenna encompassed by the present invention.

An exemplary embodiment antenna of the present invention is illustrated in FIG. 3 with reference to an antenna 45. Antenna 45 comprises a coil 50 having respective ends 52 and 54 which connect with an interrogator processor (not shown). Coil 50 comprises a central region 56 and a pair of side regions 58 and 60. Central region 56 can also be referred to as a major region, and side regions 58 and 60 can be referred to as minor regions, with the terms "major" and "minor" indicating the relative larger size of region 56 as compared to regions 58 and 60. Antenna 45 can be configured to operate at a suitable frequency for a particular application, such as, for example, a resonant frequency of about 125 kHz.

Central region 56 is within a plane 62 (shown as a dashed line) and side regions 58 and 60 are within respective planes 64 and 66 (shown as dashed lines). Planes 64 and 66 intersect plane 62 at angles 68 and 70, respectively. Angles 68 and 70 can be from greater than 0° to about 90°, are preferably from about 30° to about 60°, and are more preferably about 45°. It is noted that planes 64 and 66 also intersect one another (although the line of intersection is not shown in FIG. 3). An alternative method of describing antenna 45 is with respect to the shape seen from a particular view, such as, for example, a view of the top side. The shape viewed from the top side comprises central region 56 extending into peripheral regions 58 and 60 through angles 68 and 70, respectively. Exemplary dimensions of antenna 45 are as follows. A length of central region 56 along the top side is preferably from about ten inches to about 15 inches with 13 inches being more preferred, a length of peripheral regions 58 and 60 along the top side is preferably from about two inches to about ten inches, with about five inches being more preferred, and a height "Y" is preferably from about two feet to about four feet, with about three feet being more preferred.

Referring to FIG. 4, antenna 45 is shown incorporated into a housing 80. (The housing is shown in top view, and antenna 45 is shown in phantom view within the housing.) Housing 80 can comprise, for example, a polymeric material, such as, for example, plastic, and can be formed by, for example, vacuum molding, or, less preferably, injection molding. Housing 80 preferably comprises a material which is substantially transparent to a magnetic field generated by antenna 45. Although in the shown embodiment antenna is provided within housing 80 (with the antenna preferably being entirely enveloped within the material of the housing), it is to be understood that the invention encompasses other embodiments (not shown) wherein antenna 45 extends along an exterior surface of housing 80.

Figure 12:
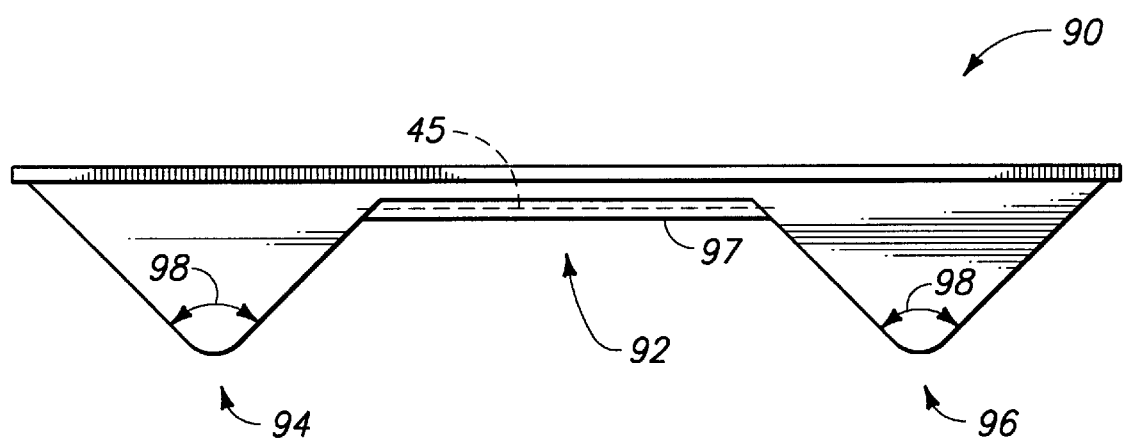
FIG. 12 is a top view of an alternate embodiment housing unit containing a coil antenna (with the antenna shown in phantom view within the housing).

Housing 80 comprises a recessed central region 82 and a pair of opposing projecting peripheral regions 84 and 86 at opposing lateral edges of central portion 82. In the shown embodiment, antenna 45 extends into opposing projecting peripheral portions 84 and 86. It is to be understood, however, that the invention comprises other embodiments wherein a planar, or other, antenna (such as that described above in the "background" section with reference to the prior art) is provided to extend along or within central portion 82 and not along or within projecting portions 84 and 86. An exemplary embodiment is shown in FIG. 12.

Projecting portions 84 and 86 comprise angles 88 at their ends, with angles 88 preferably being from about 80° to about 100°, and more preferably being about 90°.

Housing 80 comprises a rib 87 within recessed central portion 82 configured to contain an upper portion of antenna 45.

In the embodiment of FIG. 4, projections 84 and 86 terminate in sharp points. FIG. 5 illustrates another embodiment housing 90 which is similar to the housing 80 in that it comprises a recessed central region 92, a rib 97 within the recessed central region, and outwardly projecting peripheral portions 94 and 96. However, housing 90 of FIG. 5 differs from the housing 80 of FIG. 4 in that the projecting portions 94 and 96 terminate in ends which are rounded (for purposes of interpreting this document and the claims that follow, a rounded end is defined as an end having a radius of curvature of greater than or equal to 0.25 inch). Projecting portions 94 and 96 comprise angles 98 at their ends, with angles 98 preferably being from about 80° to about 100°, and more preferably being about 90°.

FIG. 6 illustrates a front view of the housing 90 of FIG. 5, and shows that housing 90 comprises upper and lower ribs 97 and 100, respectively.

FIGS. 7–9 illustrate housing 90 in use. Specifically, FIGS. 7–9 show an animal 120 (shown in dashed line and diagrammatic cross-section, and illustrated as a head portion of a cow) being passed by housing 90. FIGS. 7 and 8 illustrate that the animal's head is purposefully bumped into outwardly projecting member 94 to roll the head into recessed central portion 92. The bumping can also sway the animal body such that the animal head is initially knocked away from housing 94, and subsequently swings into central portion 92.

Housing 94 contains antenna 45 therein which is connected to an interrogator processing unit 124 through connections 126 and 128. As the animal's head moves past central region 92, a transponder tag 130 associated with the head is stimulated by a field generated by antenna 45. In response to the stimulation, transponder 130 sends data back to interrogator processor 124. The rolling of the animal's head past projection 94 causes transponder 130 to be presented in a number of different orientations relative to the antenna within housing 90, and therefore can assist in ensuring that an appropriate angle between transponder 130 and antenna 45 will be obtained to pass information between the antenna and the transponder.

FIG. 9 shows animal body being passed from housing 90, and specifically shows the head being purposely collided with outwardly projecting portion 96 to cause an orientation of transponder 130 to vary relative to the antenna 45 within housing 90. Such variation in orientation can assist in ensuring that transponder 130 achieves a suitable orientation relative to antenna 45 to enable information to be passed from transponder 130 to the interrogator.

In the embodiment of FIGS. 7–9, animal body 120 passes by housing 90 on a rail 140. It is noted that although the animal body is shown being moved while housing 90 remains stationary, the invention encompasses other embodiments (not shown), wherein the "passing the animal body past the housing" comprises moving the housing. In particular aspects of such other embodiments, the animal body remains stationary while the housing is moved. In other aspects, both the housing and the animal body are moved.

The processing of FIGS. 7–9 preferably occurs after an animal is stunned, and before the animal's hide is broken. Accordingly, the animal body can physically contact housing 90 without exposing meat to surfaces of housing 90.

FIG. 10 illustrates an exemplary process for utilizing the antenna of FIG. 3 without bumping an animal into projections. In referring to FIG. 10, identical numbering is utilized as was used in referring to FIGS. 7–9 above. In the embodiment of FIG. 10, the head of animal body 120 travels past antenna 45 without impacting the antenna. In the shown embodiment, the antenna is not within a housing. However, it is to be understood that the invention encompasses other embodiments wherein an antenna of the present invention is provided within a housing, and wherein a passing animal body is not purposefully collided with the housing.

Figure 11:
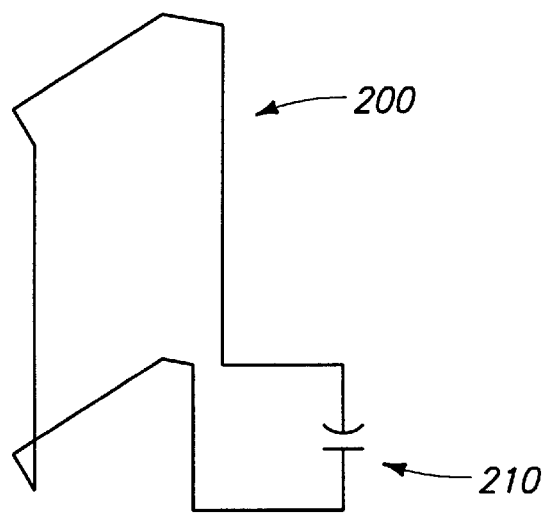
FIG. 11 is a diagrammatic, schematic, perspective view of a transponder assembly encompassed by the present invention.

As is evident from the above discussion, the invention encompasses methods wherein an interrogator antenna is bent so that different portions of the antenna are within different planes, said different planes intersecting with one another. It is noted that similar advantages to those described above can be achieved by bending an antenna associated with a transponder in a manner similar to that described above for bending an antenna associated with an interrogator. For instance, FIG. 11 illustrates an antenna 200 encompassed by the present invention and configured for utilization with a transponder. In the shown embodiment, antenna 200 is provided in an LC circuit with a capacitor 210. In particular embodiments of the present invention, one or both of the antenna of the transponder or the antenna of the interrogator can be bent to comprise portions within two different intersecting planes.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A system for electronic identification of a plurality of animal bodies, comprising:

transponders connected with respective individual animal bodies and coded to identify the individual bodies, the transponders comprising transponder antennas;

an interrogator configured to read the transponders of the animal bodies, the interrogator comprising an interrogator antenna; and at least one of the interrogator antenna or the transponder antennas comprising a coil of conductive material which has a first planar portion within a first plane and a second planar portion within a second plane, wherein the first and second planes intersect; and wherein the individual animal bodies travel on a rail past the interrogator antenna.

2. The apparatus of claim 1 wherein the interrogator antenna comprises the coil having first and second portions.

3. The apparatus of claim 1 wherein the interrogator antenna and the transponder antennas comprise the coil having first and second portions.

4. The apparatus of claim 1 wherein the transponder antennas comprise the coil having first and second portions.

5. The apparatus of claim 1 wherein the coil, when viewed from a side, has central portion, and at least one peripheral portion extending at an angle from the central portion, wherein the angle is from greater than 0° to about 90°.

6. The apparatus of claim 1 wherein the coil, when viewed from a side, has central portion, and at least one peripheral portion extending at an angle from the central portion, wherein the angle is from about 30° to about 60°.

7. The apparatus of claim 1 wherein the coil, when viewed from a side, has central portion and a pair of peripheral portions extending at angles from opposing edges of the central portion; the angles being from greater than 0° to about 90°.

8. The apparatus of claim 1 wherein the coil, when viewed from a side, has central portion and a pair of peripheral portions extending at angles from opposing edges of the central portion; the angles being from about 30° to about 60°.

9. The apparatus of claim 1 wherein relative orientations of the transponders to the interrogator antenna varies from one of the individual animal bodies to another.

10. The apparatus of claim 1 wherein the individual animal bodies hang from a rail and travel along the rail past the interrogator antenna.

11. The apparatus of claim 1 wherein the individual animal bodies hang from a rail and travel along the rail past the interrogator antenna, and wherein at least part of at least some of the individual animal bodies can swivel relative to the rail and cause an orientation of transponders associated with the at least some animal bodies to vary relative to the rail.

12. The apparatus of claim 11 wherein the individual animal bodies are cow bodies and wherein the transponders are attached to ears of the cow bodies.

13. A system for electronic identification of a plurality of units, comprising:
transponders connected with respective individual units and coded to identify the individual units, the transponders comprising transponder antennas;
an interrogator configured to read the transponders of the units, the interrogator comprising an interrogator antenna; and
at least one of the interrogator antenna or the transponder antennas comprising a coil of conductive material which has a major planar portion within a first plane and a minor planar portion within a second plane, and wherein the first and second planes extend an angle of from about 30° to about 60° relative to one another.

14. The apparatus of claim 13 wherein the minor portion has a length less than or equal to about one-third of a length of the major portion.

15. The apparatus of claim 13 further comprising an other minor portion, said other minor portion extending within a third plane which intersects the first and second planes, and which intersects the first plane at an angle of from about 30° to about 60°.

16. The apparatus of claim 13 wherein the interrogator antenna comprises the coil having major and minor portions.

17. The apparatus of claim 13 wherein the interrogator antenna and the transponder antennas comprise the coil having major and minor portions.

18. The apparatus of claim 13 wherein the transponder antennas comprise the coil having major and minor portions.

19. An apparatus for electronic identification of a plurality of passing animal bodies, wherein the individual animal bodies have respective transponders associated therewith and coded to identify the individual animal bodies, comprising:
an interrogator having an antenna associated therewith which is configured to stimulate the transponders of the passing animal bodies; and
a housing supporting the antenna, the housing comprising a central read face having a pair of projecting portions joined thereto, the projecting portions extending from opposing edges of the read face and extending toward the passing animal bodies to at least partially block a path of the passing animal bodies.

20. The method of claim 19 wherein the antenna is entirely enveloped within a material of the housing.

21. The method of claim 19 wherein the antenna is entirely enveloped within a material of the housing and extends into neither of the projecting portions.

22. The method of claim 19 wherein the antenna is entirely enveloped within a material of the housing and extends into at least one of the projecting portions.

23. The method of claim 19 wherein the antenna is entirely enveloped within a material of the housing and extends into both of the projecting portions.

24. An apparatus for electronic identification of a plurality of passing animal bodies, wherein the individual animal bodies have respective transponders associated therewith and coded to identify the individual animal bodies, comprising:
an interrogator configured to pass the animal bodies;
an antenna associated with the interrogator, the antenna comprising a coil of conductive material, the coil, when viewed from the top having central portion and a peripheral portion extending from the central portion at an angle; the angle being from about 30° to about 60°; and
a housing containing the antenna.

25. The apparatus of claim 24 wherein the housing comprises a material substantially transparent to magnetic fields generated by the antenna.

26. The apparatus of claim 24 wherein the housing comprises a periphery proximate the passing animal bodies, said periphery having a shape comprising a recessed central region and a projecting peripheral region extending from the central region; the projecting peripheral region being configured to collide with the passing animal bodies and rotate at least a portion of individual passing animal bodies to change an orientation of transponders associated with the individual passing animal bodies relative to the antenna.

27. The apparatus of claim 26 wherein the housing comprises two opposing projecting peripheral portions at opposing edges of the central portion.

28. The apparatus of claim 26 wherein the projecting peripheral portion terminates in a pointed end.

29. The apparatus of claim 26 wherein the projecting peripheral portion terminates in a rounded end.

30. The apparatus of claim 24 wherein the housing comprises a periphery proximate the passing animal bodies, said periphery having a shape comprising a recessed central region and a projecting peripheral region extending from the central region; the antenna extending along the central region and into the projecting peripheral region.

31. The apparatus of claim 30 wherein the projecting peripheral region is configured to bump the passing animal bodies and rotate at least a portion of individual passing animal bodies to change an orientation of transponders associated with the individual passing animal bodies relative to the interrogator antenna.

32. The apparatus of claim 30 wherein the housing comprises two opposing projecting peripheral portions at opposing edges of the central portion; and wherein the antenna extends into both of the opposing projecting peripheral portions.

33. The apparatus of claim 30 wherein the projecting peripheral portion terminates in a pointed end.

34. The apparatus of claim 30 wherein the projecting peripheral portion terminates in a rounded end.

35. A method for electronically identifying a plurality of animal bodies, comprising:
   providing transponders connected with respective individual animal bodies and coded to identify the individual units, the transponders comprising transponder antennas;
   providing an interrogator configured to read the transponders of the units, the interrogator comprising an interrogator antenna; at least one of the interrogator antenna or the transponder antennas comprising a coil of conductive material which has a first planar portion within a first plane and a second planar portion within a second plane, and wherein the first and second planes intersect;
   passing the animal bodies having the transponders connected therewith past the interrogator antenna;
   stimulating the transponders with a field produced by the antenna;
   sending data from the stimulated transponders to the interrogator; and
   receiving the data with the interrogator; and
   wherein the passing comprises passing the individual animal bodies on a rail past the interrogator antenna.

36. The method of claim 35 wherein the interrogator antenna comprises the coil having first and second portions.

37. The apparatus of claim 35 wherein the interrogator antenna and the transponder antennas comprise the coil having first and second portions.

38. The apparatus of claim 35 wherein the transponder antennas comprise the coil having first and second portions.

39. The apparatus of claim 35 wherein relative orientations of the transponders to the interrogator vary from one of the individual animal bodies to another.

40. The apparatus of claim 35 wherein the passing comprises passing the individual animal bodies on a rail past the interrogator antenna, and wherein the individual animal bodies hang from said rail.

41. A method of identifying a plurality of passing units, wherein the individual units have respective transponders associated therewith and coded to identify the individual units, comprising:
   providing an interrogator having an antenna associated therewith, the antenna comprising a coil of conductive material which has a major planar portion within a first plane and a minor planar portion within a second plane, and wherein the first and second planes extend an angle of from about 30° to about 60° relative to one another;
   generating a field with the antenna;
   passing the units by the interrogator antenna and stimulating the transponders of the passing units with the field; and
   transmitting data from the stimulated transponders to the interrogator; the date identifying the units associated with the transponders.

42. The method of claim 41 wherein relative orientations of the transponders to the interrogator vary from one of the individual units to another.

43. The method of claim 41 wherein the passing comprises moving the individual units on a rail past the interrogator antenna.

44. The method of claim 41 wherein the units hang from a rail and wherein the passing comprises moving the units along the rail and past the interrogator antenna.

45. The method of claim 44 wherein the individual units are animal bodies.

46. The method of claim 44 wherein the individual units are cow bodies.

47. A method for electronic identification of a plurality of passing animal bodies, wherein the individual animal bodies have respective transponders associated therewith and coded to identify the individual animal bodies, comprising:
   providing an interrogator having an antenna associated therewith, the antenna being proximate a housing, the housing comprising a periphery with a shape comprising a recessed central region and a projecting peripheral region extending from the central region; the antenna extending along the central region;
   passing animal bodies by the housing; at least some of the passing animal bodies being purposefully bumped against the projecting peripheral region.

48. The method of claim 47 wherein, after the bumping the animal bodies enter the recessed central region; the bumping into the projecting peripheral region changing an orientation of transponders associated with the individual passing animal bodies relative to the antenna.

49. The method of claim 47 wherein antenna is within the housing.

50. The method of claim 47 wherein the housing comprises two opposing projecting peripheral portions at opposing edges of the central portion, and wherein at least some of the passing animal bodies are purposefully bumped both of the projecting peripheral portions.

51. The method of claim 47 wherein the projecting peripheral portion terminates in a pointed end.

52. The method of claim 47 wherein the projecting peripheral portion terminates in a rounded end.

53. The method of claim 47 wherein the housing comprises two opposing projecting peripheral portions at opposing edges of the central portion; wherein the antenna is within the housing, wherein the antenna extends into both of the opposing projecting peripheral portions; and wherein at least some of the passing animal bodies bump into both projecting peripheral portions as the pass the housing.

54. The method of claim 53 wherein the projecting peripheral portions terminate in pointed ends.

55. The method of claim 53 wherein the projecting peripheral portions terminate in rounded ends.

56. A system for electronic identification of a plurality of units, comprising:
   transponders connected with respective individual units and coded to identify the individual units, the transponders comprising transponder antennas;
   an interrogator configured to read the transponders of the units, the interrogator comprising an interrogator antenna; and
   at least the transponder antenna comprising a coil of conductive material which has a first planar portion within a first plane and a second planar portion within a second plane, and wherein the first and second planes intersect.

57. The apparatus of claim 56 wherein the interrogator antenna and the transponder antennas comprise the coil having first and second portions.

58. The apparatus of claim 56 wherein relative orientations of the transponders to the interrogator antenna varies from one of the individual units to another.

59. The apparatus of claim 56 wherein the individual units travel on a rail past the interrogator antenna.

60. The apparatus of claim 56 wherein the individual units hang from a rail and travel along the rail past the interrogator antenna.

61. A system for electronic identification of a plurality of units, comprising:

transponders connected with respective individual units and coded to identify the individual units, the transponders comprising transponder antennas;

an interrogator configured to read the transponders of the units, the interrogator comprising an interrogator antenna; and at least one of the interrogator antenna or the transponder antennas comprising a coil of conductive material which has a first planar portion within a first plane and a second planar portion within a second plane, wherein the first and second planes intersect; and wherein the coil, when viewed from a side, has central portion, and at least one peripheral portion extending at an angle from the central portion, wherein the angle is from greater than 0° to about 90°.

62. A system for electronic identification of a plurality of units, comprising:

transponders connected with respective individual units and coded to identify the individual units, the transponders comprising transponder antennas;

an interrogator configured to read the transponders of the units, the interrogator comprising an interrogator antenna; and at least one of the interrogator antenna or the transponder antennas comprising a coil of conductive material which has a first planar portion within a first plane and a second planar portion within a second plane, wherein the first and second planes intersect; and wherein the coil, when viewed from a side, has central portion, and at least one peripheral portion extending at an angle from the central portion, wherein the angle is from about 30° to about 60°.

63. A system for electronic identification of a plurality of units, comprising:

transponders connected with respective individual units and coded to identify the individual units, the transponders comprising transponder antennas;

an interrogator configured to read the transponders of the units, the interrogator comprising an interrogator antenna; and at least one of the interrogator antenna or the transponder antennas comprising a coil of conductive material which has a first planar portion within a first plane and a second planar portion within a second plane, wherein the first and second planes intersect; and wherein the coil, when viewed from a side, has central portion and a pair of peripheral portions extending at angles from opposing edges of the central portion; the angles being from greater than 0° to about 90°.

64. A system for electronic identification of a plurality of units, comprising:

transponders connected with respective individual units and coded to identify the individual units, the transponders comprising transponder antennas;

an interrogator configured to read the transponders of the units, the interrogator comprising an interrogator antenna; and at least one of the interrogator antenna or the transponder antennas comprising a coil of conductive material which has a first planar portion within a first plane and a second planar portion within a second plane, wherein the first and second planes intersect; and wherein the coil, when viewed from a side, has central portion and a pair of peripheral portions extending at angles from opposing edges of the central portion; the angles being from about 30° to about 60°.

65. A system for electronic identification of a plurality of units, comprising:

transponders connected with respective individual units and coded to identify the individual units, the transponders comprising transponder antennas;

an interrogator configured to read the transponders of the units, the interrogator comprising an interrogator antenna; and at least one of the interrogator antenna or the transponder antennas comprising a coil of conductive material which has a first planar portion within a first plane and a second planar portion within a second plane, wherein the first and second planes intersect; and wherein the individual units hang from a rail and travel along the rail past the interrogator antenna, and wherein at least part of at least some of the individual units can swivel relative to the rail and cause an orientation of transponders associated with the at least some units to vary relative to the rail.

66. A method for electronically identifying a plurality of units, comprising:

providing transponders connected with respective individual units and coded to identify the individual units, the transponders comprising transponder antennas;

providing an interrogator configured to read the transponders of the units, the interrogator comprising an interrogator antenna; the interrogator antenna and the transponder antennas comprising a coil of conductive material which has a first planar portion within a first plane and a second planar portion within a second plane, and wherein the first and second planes intersect;

passing the units having the transponders connected therewith past the interrogator antenna;

stimulating the transponders with a field produced by the antenna;

sending data from the stimulated transponders to the interrogator; and receiving the data with the interrogator.

67. A method for electronically identifying a plurality of units, comprising:

providing transponders connected with respective individual units and coded to identify the individual units, the transponders comprising transponder antennas;

providing an interrogator configured to read the transponders of the units, the interrogator comprising an interrogator antenna; the transponder antenna comprising a coil of conductive material which has a first planar portion within a first plane and a second planar portion within a second plane, and wherein the first and second planes intersect;

passing the units having the transponders connected therewith past the interrogator antenna;

stimulating the transponders with a field produced by the antenna;

sending data from the stimulated transponders to the interrogator; and receiving the data with the interrogator.

* * * * *